UNITED STATES PATENT OFFICE.

IVAN LEVINSTEIN AND CARL MENSCHING, OF MANCHESTER, ENGLAND, ASSIGNORS TO LEVINSTEIN, LIMITED, OF MANCHESTER, ENGLAND.

BLACK SULFUR DYE AND PROCESS OF MAKING SAME.

SPECIFICATION forming part of Letters Patent No. 702,369, dated June 10, 1902.

Application filed October 5, 1901. Serial No. 77,628. (Specimens.)

*To all whom it may concern:*

Be it known that we, IVAN LEVINSTEIN, a citizen of the British Empire, and CARL MENSCHING, Ph. D., a citizen of the German Empire, both residing at Manchester, in the county of Lancaster, England, have invented certain new and useful Improvements in Black Sulfur Dyes and Processes of Making Same, of which the following is a full, clear, and exact description.

In the specification of Letters Patent No. 655,659 there is described the manufacture of black coloring-matters directly dyeing cotton by heating dinitrophenol in an aqueous solution, together with sulfur and the sulfid of an alkali metal. In the specification of German Letters Patent No. 125,586 there is also described the manufacture of a coloring-matter by treating picric acid in a similar manner.

We have discovered that black coloring-matters totally different from those produced as described in the United States and German specifications above cited are produced by heating with sulfur and the sulfid of an alkali metal in an aqueous solution, either at the boiling-point or at a higher temperature and with or without the addition of a metal—such, for example, as zinc—or of a salt of a heavy metal, mixtures in variable proportions of either dinitrophenol or of picric acid or of mixtures of these two substances or the corresponding amido or nitroamido derivatives of phenol, such as picramic acid, with oxyazobenzene or its homologues or substitution products. This reaction is remarkable, since oxyazobenzene when heated in aqueous solution with sulfur and a sulfid of an alkali metal yields a substance of no tinctorial value.

The following examples illustrate in what manner we may carry our invention into effect. It is to be understood that the proportions specified in the examples may be varied considerably.

Example I: Eighty-five kilos of crystallized sodium sulfid, 18.4 kilos of sulfur, and fifty liters of water are boiled together until the solution is clear. There is then gradually added to it a mixture of 18.4 kilos of dinitrophenol and 9.4 kilos of oxyazobenzene, and the product is boiled in a reflux apparatus until the formation of the coloring-matter is complete. The coloring-matter is precipitated by means of mineral acids or of common salt or of sodium bicarbonate or by the introduction of a current of air. It easily dissolves in a hot solution of sodium sulfid, to which it gives a greenish-black color. This solution dyes unmordanted cotton blue-black shades, while the coloring-matters obtained from dinitrophenol or from picric acid alone dye blacks of a dull and red shade.

Example II: Eighty-five kilos of crystallized sodium sulfid, 18.4 kilos of sulfur, and fifty liters of water are boiled together, and there is gradually added a mixture containing 22.9 kilos of picric acid, 9.2 kilos of oxyazobenzene, and 4.5 kilos of zinc-dust. The whole mixture is heated in a reflux apparatus until the formation of the coloring-matter is complete. The black coloring-matter thus produced is separated as described under Example I. It easily dissolves in a hot solution of sodium sulfid, forming a greenish-black solution, which dyes unmordanted cotton a bright red-black shade, which possesses a full plum overhand appearance resembling that produced by logwood.

Example III: Eighty-five kilos of crystallized sodium sulfid are dissolved in fifty liters of water and 18.4 kilos of sulfur are added thereto. There is then slowly added a mixture of 19.9 kilos of picramic acid and 9.2 kilos of oxyazobenzene, and the mixture is boiled until the formation of the coloring-matter is complete. The coloring-matter is precipitated, as described under Example I, and is a dyestuff which produces on unmordanted cotton similar shades to those produced by the product of Example II.

The process may be carried out either by boiling in an open vessel provided with a reflux-condenser, or a sufficient dilution may be maintained by the addition of water from time to time.

By varying the proportions valuable blacks are obtained which dye unmordanted cotton shades varying from bright red-black to violet and greenish blacks, as is shown by the following examples:

|  | IV. | V. | VI. |
|---|---|---|---|
| Picric acid | 12 parts. | 9 parts. | 7.5 parts. |
| Oxyazobenzene | 3 parts. | 6 parts. | 7.5 parts. |
| Sodium sulfid | 50 parts. | 50 parts. | 50 parts. |
| Sulfur | 15 parts. | 15 parts. | 15 parts. |
| Dyes unmordanted cotton. | Bright red-black. | Violet-black, logwood-like plumming overhand. | Greenish black. |

Having now particularly described our invention, we declare that what we claim is—

1. The hereinbefore-described process for the production of black sulfid coloring-matters which consists in heating in the wet way and with the condition of dilution maintained, the hereinbefore-described nitrophenols with oxyazobenzene and with sulfur and a sulfid of an alkali metal, substantially as set forth.

2. As new black sulfur coloring-matters, a black powder produced by heating in the wet way and with the condition of dilution maintained, the hereinbefore-described nitrophenols with oxyazobenzene and with sulfur and a sulfid of an alkali metal, which powder is insoluble in water, insoluble in alcohol, soluble in a solution of sodium sulfid with a greenish-black color, soluble in concentrated sulfuric acid and precipitated therefrom on dilution with water, and dyes unmordanted cotton shades varying from bright red-black to greenish black.

In witness whereof we have subscribed our signatures in presence of two witnesses.

IVAN LEVINSTEIN.
CARL MENSCHING.

Witnesses:
WILLIAM E. HEYS,
ARTHUR MILLWARD.